(12) United States Patent
Matsuno et al.

(10) Patent No.: US 9,335,209 B2
(45) Date of Patent: May 10, 2016

(54) OPTICAL MODULE AND ELECTRONIC APPARATUS

(71) Applicant: Seiko Epson Corporation, Tokyo (JP)

(72) Inventors: Yasushi Matsuno, Matsumoto (JP); Tsugio Gomi, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/628,642

(22) Filed: Feb. 23, 2015

(65) Prior Publication Data

US 2015/0241270 A1    Aug. 27, 2015

(30) Foreign Application Priority Data

Feb. 26, 2014    (JP) ................................. 2014-035041

(51) Int. Cl.
| | |
|---|---|
| *G02B 5/20* | (2006.01) |
| *G01J 1/04* | (2006.01) |
| *G01J 1/02* | (2006.01) |
| *G01J 3/02* | (2006.01) |
| *G01J 3/26* | (2006.01) |
| *G01J 3/50* | (2006.01) |
| *G02B 5/28* | (2006.01) |
| *G02B 26/00* | (2006.01) |
| *G01J 1/32* | (2006.01) |

(52) U.S. Cl.
CPC .............. *G01J 1/0488* (2013.01); *G01J 1/0214* (2013.01); *G01J 1/0271* (2013.01); *G01J 1/32* (2013.01); *G01J 3/0291* (2013.01); *G01J 3/26* (2013.01); *G01J 3/506* (2013.01); *G02B 5/284* (2013.01); *G02B 26/001* (2013.01)

(58) Field of Classification Search
CPC ...... G01J 1/0488; G01J 1/0214; G01J 1/0271
See application file for complete search history.

(56) References Cited

U.S. PATENT DOCUMENTS

| | | | |
|---|---|---|---|
| 8,934,095 B2 * | 1/2015 | Jung ...................... | A61C 19/04 356/326 |
| 9,029,968 B2 * | 5/2015 | Tsukagoshi ............... | G01J 1/44 257/431 |

(Continued)

FOREIGN PATENT DOCUMENTS

| | | |
|---|---|---|
| EP | 0421304 A1 | 4/1991 |
| JP | 2009-290031 A | 12/2009 |

(Continued)

OTHER PUBLICATIONS

Extended European Search Report for Patent Application No. EP 15156296.4 dated Oct. 28, 2015 (5 pages).

*Primary Examiner* — Tony Ko
(74) *Attorney, Agent, or Firm* — Harness, Dickey & Pierce, P.L.C.

(57) ABSTRACT

An optical module includes a circuit substrate that has a concave portion and a flat surface, an optical sensor that is disposed inside a space, and an optical filter device that has a base which accommodates a variable wavelength interference filter and has a light-through hole through which light emitted from the variable wavelength interference filter passes and a first glass member which is disposed in the light-through hole. The first glass member is positioned inside the space. The base is bonded to the flat surface. The distance between the first glass member and the optical sensor is set to a distance at which light emitted from the variable wavelength interference filter does not interfere between the first glass member and the optical sensor.

17 Claims, 8 Drawing Sheets

(56) References Cited

U.S. PATENT DOCUMENTS

| | | |
|---|---|---|
| 2009/0294779 A1 | 12/2009 | Ida et al. |
| 2011/0228397 A1* | 9/2011 | Matsushita ............... G01J 3/26 359/578 |
| 2012/0235038 A1 | 9/2012 | Nishikawa et al. |
| 2012/0298867 A1 | 11/2012 | Nishikawa et al. |
| 2013/0181120 A1* | 7/2013 | Shinto ................. G02B 5/0808 250/226 |
| 2013/0208359 A1 | 8/2013 | Matsuno et al. |
| 2014/0192077 A1 | 7/2014 | Gomi et al. |
| 2014/0268344 A1* | 9/2014 | Arakawa ................... G01J 3/26 359/580 |

FOREIGN PATENT DOCUMENTS

| | | |
|---|---|---|
| JP | 2009-290033 A | 12/2009 |
| JP | 2011-027699 A | 2/2011 |
| JP | 2014-132304 A | 7/2014 |
| WO | WO-2011-071011 A1 | 6/2011 |

* cited by examiner

OPTICAL MODULE AND ELECTRONIC APPARATUS

BACKGROUND

1. Technical Field

The present invention relates to an optical module and an electronic apparatus.

2. Related Art

A known configuration for fixing an optical filter to a substrate having a light-receiving element disposed thereon includes an optical filter packaged in a casing that accommodates the optical filter, and the package is fixed to the substrate (for example, refer to JP-A-2011-27699).

The device disclosed in JP-A-2011-27699 is a CAN package in which the package is configured by a stem and a cap. A circuit block accommodating the light-receiving element is disposed in the stem via a spacer. In addition, a window hole is formed in the cap, and an infrared optical filter is disposed in the window hole.

Incidentally, the optical filter and the light-receiving element are accommodated by the same package in JP-A-2011-27699. Thus, in JP-A-2011-27699, it is necessary for the optical filter and the light-receiving element to be in close proximity to each other when miniaturizing the package. However, when a variable wavelength interference filter (Fabry-Perot etalon) is used as the optical filter, light interference occurs between the variable wavelength interference filter and the light-receiving element depending on the distance between the variable wavelength interference filter and the light-receiving element. As a result, the measurement accuracy of the device is degraded. Therefore, it is difficult for the package to be effectively miniaturized.

Configuring the package that accommodates the variable wavelength interference filter and the light-receiving element as separate bodies has also been considered. In this case, the package is bonded to the substrate, but a separation distance is provided to the extent necessary so that light interference does not occur between the variable wavelength interference filter and the light-receiving element. Here, when the package and the substrate are bonded by, for example, a bonding member such as solder or the like, the required distance is secured by the thickness dimension of the solder. However, this poses a problem of inclining the package relative to the substrate due to the solder. In addition, configuring the package to be bonded to the substrate via the spacer problematically increases the number of components involved.

SUMMARY

An advantage of some aspects of the invention is to provide an optical module and an electronic apparatus that have a simple configuration and high measurement accuracy.

According to an aspect of the invention, there is provided an optical module including a substrate that includes a flat surface portion and a hole portion which is disposed in the flat surface portion, a light-receiving element that is disposed inside a space which is enclosed by the hole portion and an imaginary plane which is in the same plane as the flat surface portion, and an optical filter device that includes a casing which accommodates an interference filter and includes a light-through hole through which light emitted from the interference filter passes and a translucent member which is disposed in the light-through hole, the translucent member being positioned inside the space and the casing being bonded to the flat surface portion, in which the distance between the translucent member and the light-receiving element is set to a distance at which light emitted from the interference filter does not interfere between the translucent member and the light-receiving element.

In this case, the light-receiving element and the translucent member are accommodated by the hole portion of the substrate. The distance between the translucent member and the light-receiving element is set to a distance at which light emitted from the interference filter does not interfere between the translucent member and the light-receiving element by using the dimension of the substrate in the thickness direction. In such a configuration, the wavelength range of light that interferes between the translucent member and the light-receiving element does not overlap with the wavelength range of light emitted from the interference filter. Therefore, light that interferes between the translucent member and the light-receiving element does not influence the measurement accuracy, and the light-receiving element can receive light emitted from the interference filter with high accuracy.

As in the related art, when the optical filter device is bonded to the substrate by using a bonding member made of solder or the like, and the distance between the translucent member and the light-receiving element is set by the amount of the bonding member, it is necessary for the amount of the bonding member to be increased to secure a necessary distance. In this case, a problem of inclination of the optical filter device regarding the substrate occurs as described above. Regarding this, in the embodiments of the invention, the smallest bonding member may be used even when the optical filter device and the substrate are bonded together by the bonding member according to the above configuration. Thus, inclination of the optical filter device can be suppressed, and light of a predetermined wavelength can be emitted from the interference filter with high accuracy. In addition, a decrease in the number of components and simplification of the configuration results when compared with a case where the distance between the optical filter device and the light-receiving element is set by interposing a spacer and the like therebetween.

It is preferable that the distance between the translucent member and the light-receiving member be a distance that is 10 times greater than the wavelength of light emitted from the interference filter.

In this case, the distance between the translucent member and the light-receiving element is 10 times greater than the wavelength of light emitted from the interference filter. When the distance between the translucent member and the light-receiving element is smaller than or equal to the wavelength of light emitted from the interference filter, the light intensity of an objective wavelength transmitted through the interference filter is decreased because of, for example, the influence of light interference that occurs between the translucent member and the light-receiving element. In this case, because of a decrease in light intensity, the influence of noise components and the like becomes great, and the measurement accuracy is decreased. Regarding this, such a configuration described above can suppress the influence of light interference between the translucent member and the light-receiving element and can suppress a decrease in measurement accuracy.

It is preferable that the interference filter include a pair of reflective films that face each other and a gap changing unit that changes the dimension of a gap between the pair of reflective films, and the distance between the translucent member and the light-receiving element be a distance that is 10 times greater than the wavelength of light emitted from the interference filter when the dimension of the gap is set to the maximum.

In this case, the distance between the translucent member and the light-receiving element is set to be 10 times greater than the maximum wavelength of light emitted from the interference filter.

According to the configuration described above, the wavelength range of light that interferes between the translucent member and the light-receiving element does not overlap with the wavelength range of light emitted from the interference filter even when the wavelength of light emitted from the interference filter is changed. Therefore, the influence of light that interferes between the translucent member and the light-receiving element can be suppressed more securely, and a measuring process (light-receiving process) can be performed with high accuracy.

It is preferable that the distance between the translucent member and the light-receiving member be a distance that is 100 times greater than the wavelength of light emitted from the interference filter.

In this case, increasing the distance between the translucent member and the light-receiving element further than the distance in the configuration described above can suppress the influence of light interference between the translucent member and the light-receiving element more securely and can suppress a decrease in measurement accuracy.

It is preferable that the hole portion be a concave portion that is disposed in the substrate, and the light-receiving element be disposed on a bottom surface of the concave portion.

In this case, the light-receiving element is disposed inside the concave portion disposed in the substrate. In such a configuration, for example, the light-receiving element can be arranged at a bottom portion of the concave portion, and simplification of the configuration results.

It is preferable that the hole portion be a through hole that penetrates the substrate along the direction of a normal to the flat surface portion, the substrate include a second flat surface portion that is on the opposite side from the flat surface portion, the optical module include a second substrate that is bonded to the second flat surface portion and is arranged at a position which overlaps with the through hole in a planar view which is viewed in the direction of a normal to the flat surface portion, and the light-receiving element be disposed on the second substrate.

In this case, the light-receiving element is disposed on a surface of the second substrate on the flat surface portion side. Thus, the light-receiving element can be disposed inside the hole portion as described above. In this case, the light-receiving element is disposed in the second substrate even when the thickness of the substrate is small. Thus, the light-receiving element and the translucent member can be arranged inside the hole portion. In addition, a light-receiving element that has a light receiving sensitivity of a different wavelength range can be incorporated into the optical module by replacing the second substrate.

It is preferable that the distance between the translucent member and the interference filter be set to a distance in which light emitted from the interference filter does not interfere between the translucent member and the light-receiving element.

In this case, besides the distance between the translucent member and the light-receiving element, the distance between the translucent member and the interference filter is set to a distance in which light emitted from the interference filter does not interfere between the translucent member and the light-receiving element. Accordingly, the measuring process can be performed with higher accuracy.

It is preferable that the optical module further include a lightproof bonding member that bonds the optical filter device and the substrate together, and the bonding member be disposed on the flat surface portion enclosing the hole portion.

In this case, stray light is not incident inside the hole portion. Thus, light emitted from the interference filter can be incident on the light-receiving element with high accuracy, and noise components due to stray light and the like can be preferably removed.

According to another aspect of the invention, there is provided an electronic apparatus including an optical module that includes a substrate which includes a flat surface portion and a hole portion, a light-receiving element which is disposed inside a space enclosed by the hole portion and an imaginary plane which is in the same plane as the flat surface portion, and an optical filter device which includes a casing which accommodates an interference filter and includes a light-through hole through which light which is incident on the interference filter or light emitted from the interference filter passes and a translucent member which is disposed in the light-through hole, the translucent member being positioned inside the space and the casing being bonded to the flat surface portion, and a control unit that controls the optical module, in which the distance between the translucent member and the light-receiving element is set to a distance at which light emitted from the interference filter does not interfere between the translucent member and the light-receiving element.

In this case, the measuring process can be performed with a simple configuration and high accuracy in the light-receiving element can be achieved in the same manner as that described above. Therefore, an increase in the accuracy of the process results without a complex configuration in various processes in the electronic apparatus.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

Hereinafter, an image display apparatus of a first embodiment will be described on the basis of the accompanying drawings.

Entire Configuration of Image Display Apparatus

Figure 1:
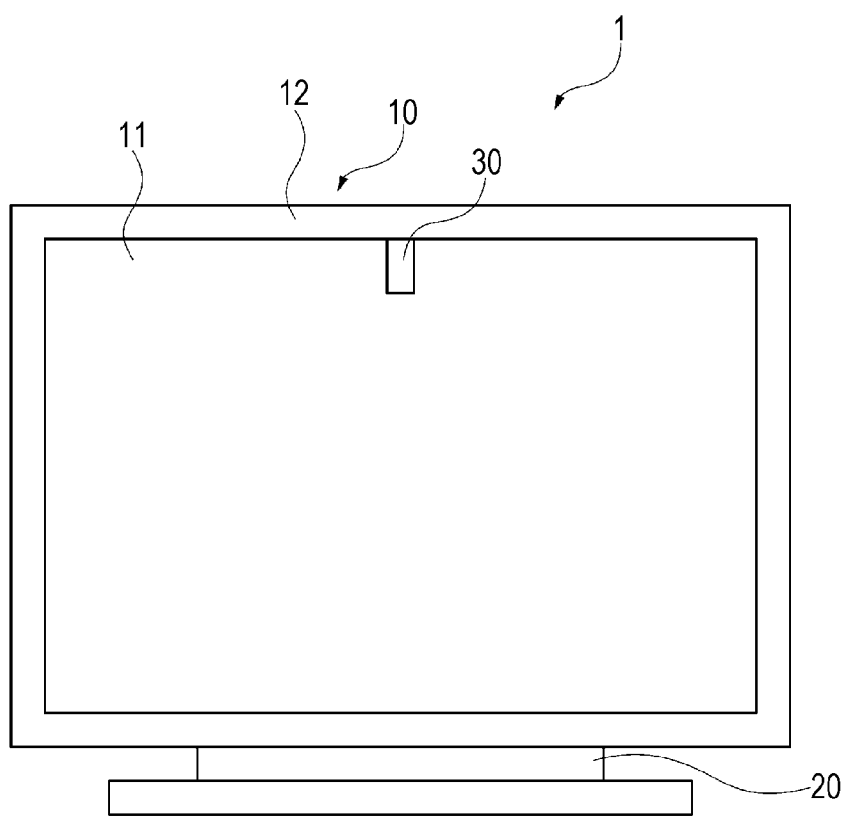
FIG. 1 is a front view illustrating the outline of an image display apparatus of a first embodiment according to the invention.
Figure 2:
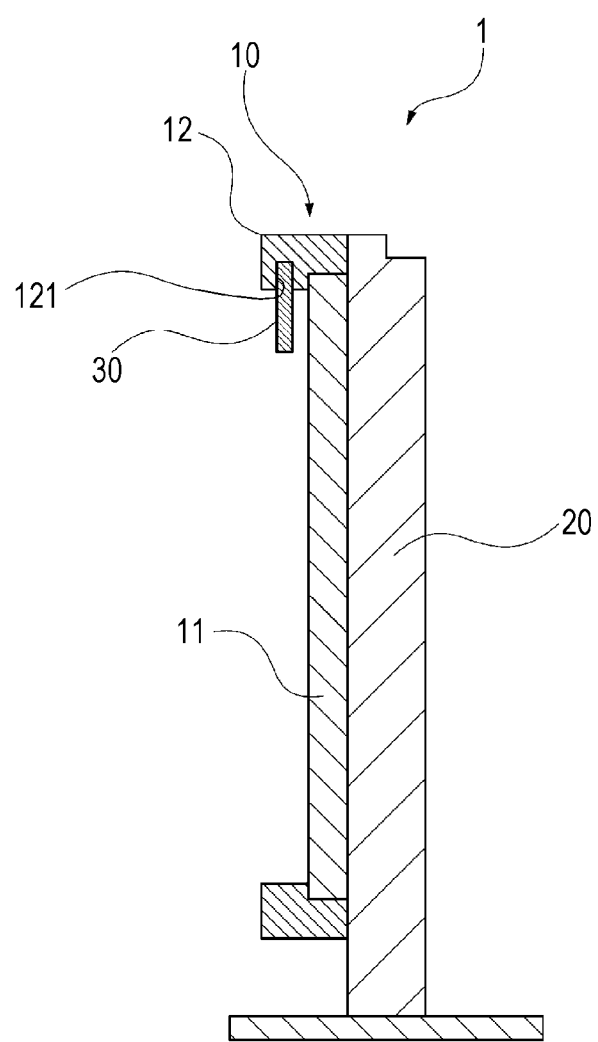
FIG. 2 is a side cross-sectional view of the image display apparatus of the first embodiment.

FIG. 1 is a front view illustrating the outline of the image display apparatus of the first embodiment. FIG. 2 is a cross-sectional view of the image display apparatus of the present embodiment.

In FIG. 1, an image display apparatus 1 of the present embodiment is an electronic apparatus and includes a display unit 10 that displays an image and an exterior portion 20 that holds the display unit 10.

The display unit 10 includes a display 11 that is a display area and a bezel portion 12 that holds the display 11 as illustrated in FIG. 1 and FIG. 2.

The display 11 may be configured by any display panel such as a liquid crystal panel, a plasma display panel (PDP), an organic EL, and the like.

The bezel portion 12 is a frame member that holds the periphery of the display 11. A photometric unit 30 is disposed in the bezel portion 12 as illustrated in FIG. 2.

A control unit 40 (refer to FIG. 7) that controls the display 11 and the photometric unit 30 is disposed inside the exterior portion 20. The control unit 40 controls the entire operation of the image display apparatus 1. The configuration of the control unit 40 will be described in detail further below.

Configuration of Photometric Unit

Next, the photometric unit 30 disposed in the bezel portion 12 will be described on the basis of the drawings.

Figure 3:
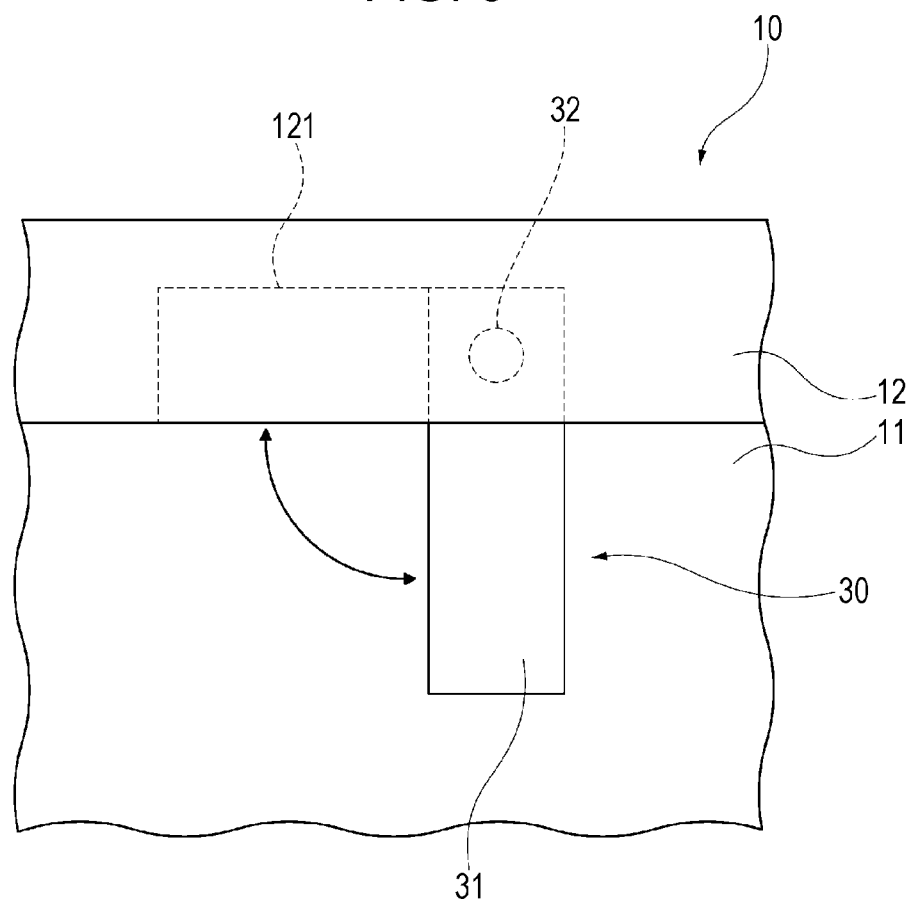
FIG. 3 is a front view illustrating the outline configuration of a photometric unit of the first embodiment.
Figure 4:
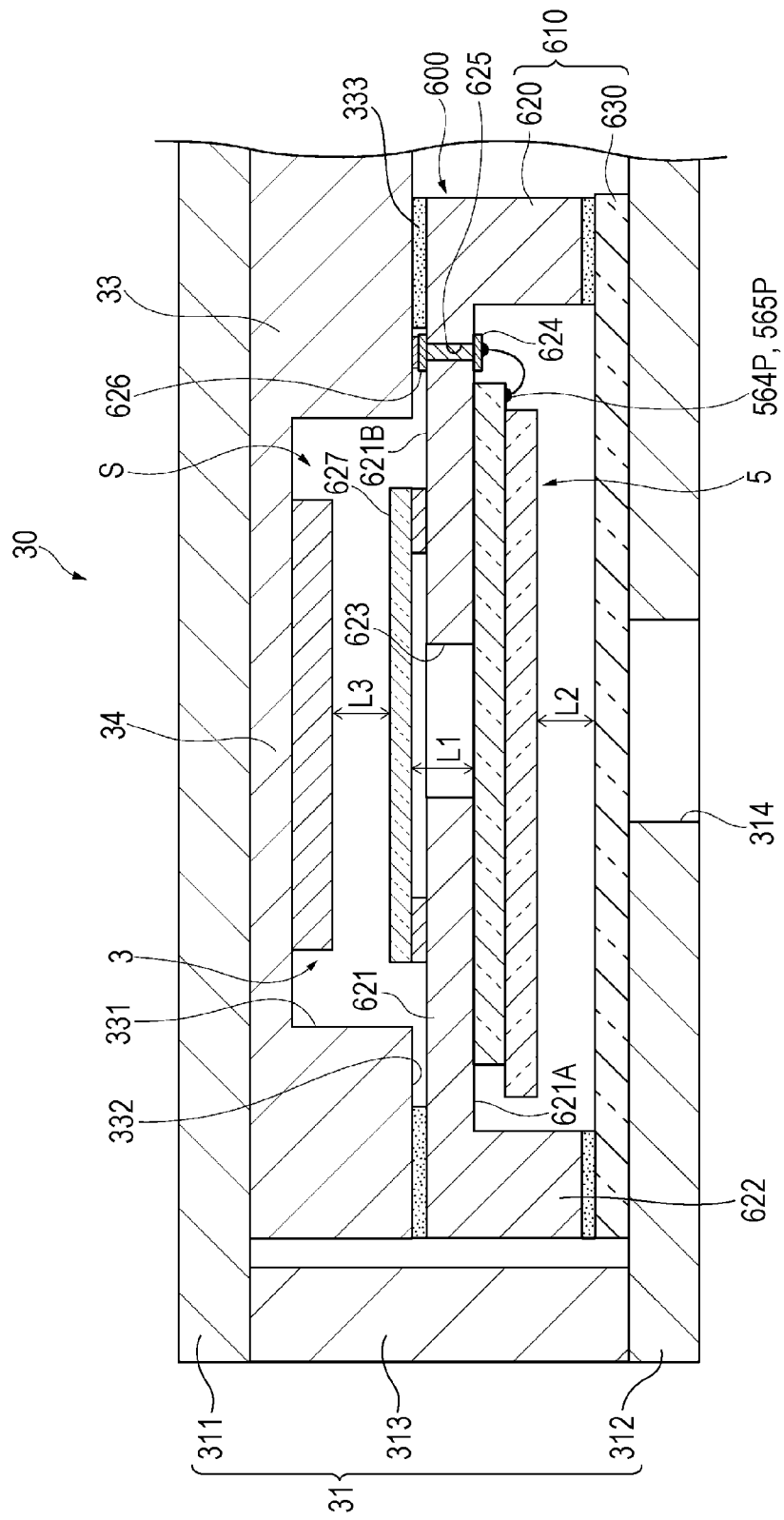
FIG. 4 is a cross-sectional view of the photometric unit of the first embodiment.

FIG. 3 is a front view in which the vicinity of the position where the photometric unit 30 is disposed in the bezel portion 12 is enlarged. FIG. 4 is a view illustrating a cross section of the photometric unit 30.

The photometric unit 30 is attached to the bezel portion 12 that encloses the display 11. A position that corresponds to the center of the upper edge of the display 11 is illustrated as the position where the photometric unit 30 is disposed in FIG. 1 and FIG. 2. However, not limited to this, the photometric unit 30, for example, may be in a corner portion of the display 11 or may be configured to be disposed on the lower edge or a side edge of the display 11.

An accommodation unit 121 that can accommodate the photometric unit 30 is disposed in the bezel portion 12 as illustrated in FIG. 2 and FIG. 3, and the photometric unit is disposed to be capable of being accommodated by the accommodation unit 121.

Specifically, the photometric unit 30 includes a case 31 that can be accommodated by the accommodation unit 121, and the case 31 is attached to the accommodation unit 121 of the bezel portion 12 by a pivot shaft 32 as illustrated in FIG. 3. Accordingly, the photometric unit 30, from the accommodation unit 121 of the bezel portion 12, can approach to and recede from an area that faces the display 11 by allowing the case 31 to pivot on the pivot shaft 32.

The case 31 includes a front panel 311, a back panel 312, and a side panel 313 as illustrated in FIG. 4, and these panels 311, 312, and 313 are configured by a lightproof member. An optical filter device 600 into which a variable wavelength interference filter 5 is incorporated, a circuit substrate 33, and an optical sensor 34 that constitutes a light-receiving element are arranged inside the case 31. An optical module 3 is configured by the optical filter device 600, the circuit substrate 33, and the optical sensor 34.

The front panel 311 is a panel arranged on the opposite side from the display 11 in the case 31.

The back panel 312 is a panel facing the display 11 when the case 31 is allowed to approach to the display 11 side by pivoting of the pivot shaft 32. A through window 314 that allows light output from the display 11 to be incident inside the case 31 is disposed at a part of the back panel 312.

The side panel 313 is a panel that connects the peripheral edges of the front panel 311 and the back panel 312 together. The side panel 313 may be configured to be integrated with the front panel 311 or the back panel 312.

Such a case 31 can suppress light from anywhere except the through window 314 being undesirably incident inside the case 31. The optical filter device 600 is arranged in the back panel 312 facing the through window 314. Accordingly, only incident light from the through window 314 can be transmitted to the optical filter device 600, and the influence of other light can be suppressed.

Configuration of Optical Filter Device

The optical filter device 600 is a device that extracts light of a predetermined objective wavelength from inspection target light which is incident from the through window 314 and emits the extracted light. The optical filter device 600 includes a casing 610 and the variable wavelength interference filter 5 that is accommodated by the casing 610 as illustrated in FIG. 4.

Configuration of Variable Wavelength Interference Filter

Figure 5:
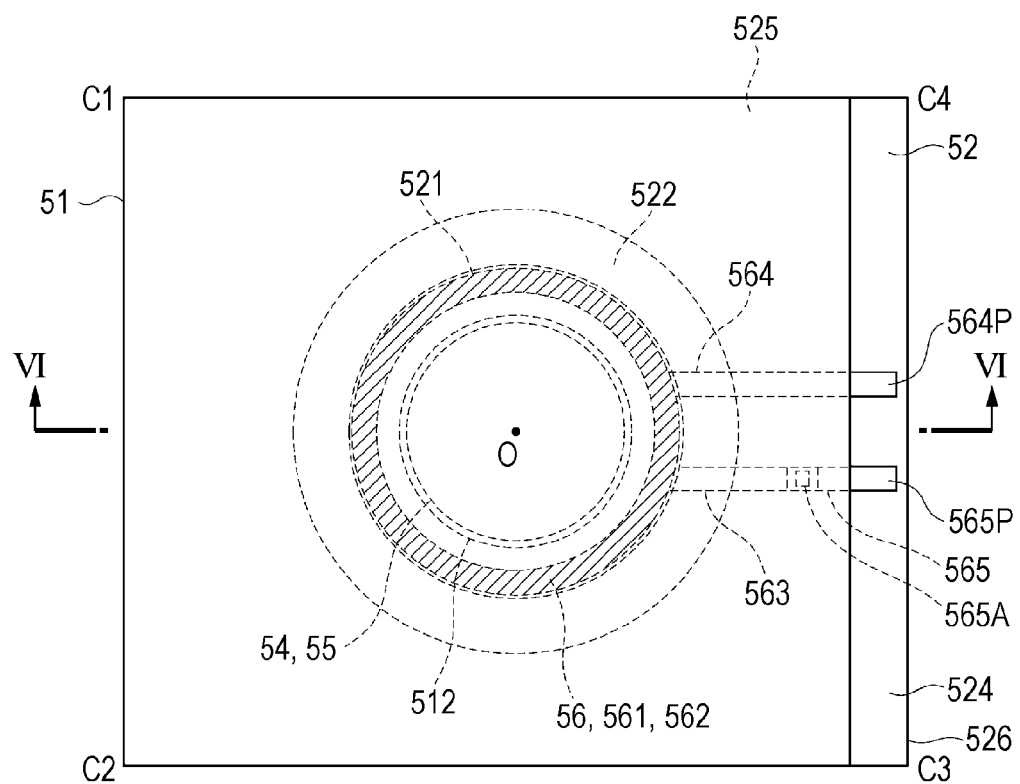
FIG. 5 is a plan view illustrating the outline of a variable wavelength interference filter of the first embodiment.
Figure 6:
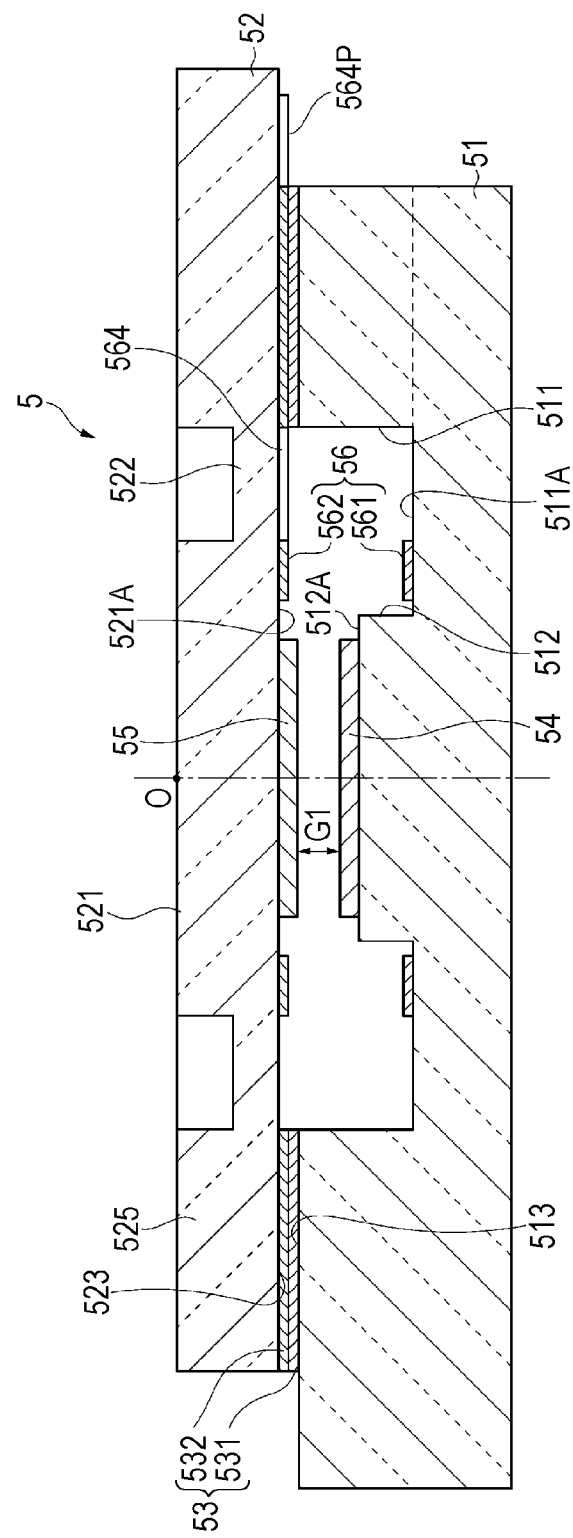
FIG. 6 is a cross-sectional view illustrating the outline of the variable wavelength interference filter of the first embodiment.

FIG. 5 is a plan view illustrating the outline configuration of the variable wavelength interference filter 5 that is accommodated by the casing 610, and FIG. 6 is a cross-sectional view illustrating the outline configuration of the variable wavelength interference filter 5 by cross-sectioning the variable wavelength interference filter 5 along the line VI-VI in FIG. 5.

The variable wavelength interference filter 5 includes a fixed substrate 51 and a movable substrate 52 as illustrated in FIG. 5 and FIG. 6. The fixed substrate 51 and the movable substrate 52 each, for example, are formed of various glasses, liquid crystals, and the like. These substrates 51 and 52 are integrally configured to be bonded together by a bonding film 53 (a first bonding film 531 and a second bonding film 532) as illustrated in FIG. 6. Specifically, a first bonding portion 513 of the fixed substrate 51 and a second bonding portion 523 of the movable substrate 52 are bonded together by the bonding film 53 that is configured by a plasma polymerized film and the like that, for example, mainly contain a siloxane.

A planar view that is viewed in the thickness direction of the fixed substrate 51 or the movable substrate 52, that is, a planar view of the variable wavelength interference filter 5 in the direction of lamination of the fixed substrate 51, the bonding film 53, and the movable substrate 52 will be called a planar view of the filter in accordance with the subsequent description.

A fixed reflective film 54 that constitutes one of a pair of reflective films is disposed on the fixed substrate 51 as illustrated in FIG. 6. In addition, a movable reflective film 55 that constitutes the other of the pair of reflective films is disposed on the movable substrate 52. The fixed reflective film 54 and the movable reflective film 55 are arranged to face each other with an inter-reflective film gap G1 interposed therebetween.

An electrostatic actuator 56 that is a gap changing unit is disposed in the variable wavelength interference filter 5 and is used in adjusting the distance of the inter-reflective film gap G1 (dimension of the gap). The electrostatic actuator 56 includes a fixed electrode 561 disposed on the fixed substrate 51 and a movable electrode 562 disposed on the movable substrate 52 and is configured by the electrodes 561 and 562 facing each other. The fixed electrode 561 and the movable electrode 562 face each other with an inter-electrode gap interposed therebetween. Here, these electrodes 561 and 562 may be configured to be directly disposed on the respective surface of the fixed substrate 51 and the movable substrate 52 or may be configured to be disposed thereon with another film member interposed between the substrate and the electrode.

The inter-reflective film gap G1 is illustrated as being configured to be formed smaller than the inter-electrode gap in the present embodiment. However, the inter-reflective film gap G1, for example, may be formed greater than the inter-electrode gap depending on the wavelength range transmitted by the variable wavelength interference filter 5.

One edge of the movable substrate 52 (for example, the edge C3-C4 in FIG. 5) protrudes further outside than the fixed substrate 51 in the planar view of the filter. The protruding part of the movable substrate 52 is an electrical equipment portion 526 that is not bonded to the fixed substrate 51. A surface in the electrical equipment portion 526 of the movable substrate 52 that is exposed when the variable wavelength interference filter 5 is viewed from the fixed substrate 51 side is an electrical equipment surface 524. Electrode pads 564P and 565P that will be described further below are disposed on the electrical equipment surface 524.

Configuration of Fixed Substrate

An electrode arrangement groove 511 and a reflective film installation portion 512 are formed in the fixed substrate 51 through etching. The fixed substrate 51 is formed thicker (greater in dimension of thickness) than the movable substrate 52, and electrostatic attraction when a voltage is applied between the fixed electrode 561 and the movable electrode 562 or stress inside the fixed electrode 561 does not cause the fixed substrate 51 to bend.

The electrode arrangement groove 511 is formed as a ring with the central point O of the filter of the fixed substrate 51 as the center in the planar view of the filter. The reflective film installation portion 512 is formed to protrude to the movable substrate 52 side from the central portion of the electrode arrangement groove 511 in the planar view. The bottom surface of the electrode arrangement groove 511 is an electrode installation surface 511A where the fixed electrode 561 is arranged. The protruding tip end surface of the reflective film installation portion 512 is a reflective film installation surface 512A.

The fixed electrode 561 that constitutes the electrostatic actuator 56 is disposed on the electrode installation surface 511A. The fixed electrode 561 is disposed in an area in the electrode installation surface 511A that faces the movable electrode 562 of a movable portion 521 that will be described further below. In addition, an insulating film may be configured to be laminated on the fixed electrode 561 to secure insulation between the fixed electrode 561 and the movable electrode 562.

A fixed extraction electrode 563 is disposed on the fixed substrate 51 and is connected to the outer circumferential edge of the fixed electrode 561. The fixed extraction electrode 563 is disposed along a connection electrode groove (not illustrated) that is formed toward the edge C3-C4 side (electrical equipment portion 526 side) from the electrode arrangement groove 511. An extending tip end portion (a part positioned on the edge C3-C4 side of the fixed substrate 51) of the fixed extraction electrode 563 is electrically connected to a fixed connection electrode 565 that is disposed on the movable substrate 52 side through a bump electrode 565A. The fixed connection electrode 565 extends from an area facing the connection electrode groove to the electrical equipment surface 524 and constitutes the fixed electrode pad 565P in the electrical equipment surface 524.

One fixed electrode 561 is illustrated as being configured to be disposed on the electrode installation surface 511A in the present embodiment. However, for example, two electrodes may be configured to be disposed concentrically with each other with the central point O of the filter as the center (double electrode configuration), or such a configuration may be used. Besides, a transparent electrode may be configured to be disposed on the fixed reflective film 54, or a connection electrode may be formed in a fixed-side electrical equipment portion from the fixed reflective film 54 by using a conductive fixed reflective film 54. In this case, the fixed electrode 561 may be configured to be partially notched depending on the position of the connection electrode.

As described above, the reflective film installation portion 512 is formed coaxially with the electrode arrangement groove 511 as a substantial cylinder that has a smaller dimension of diameter than that of the electrode arrangement groove 511, and the reflective film installation surface 512A is included in the reflective film installation portion 512 facing the movable substrate 52.

The fixed reflective film 54 is installed in the reflective film installation portion 512 as illustrated in FIG. 6. A metal film made of Ag and the like or an alloy film made of an alloy of Ag and the like, for example, can be used as the fixed reflective film 54. In addition, for example, a dielectric multilayer film with a high-refractive layer as $TiO_2$ and a low-refractive layer as $SiO_2$ may also be used. Furthermore, a reflective film in which a metal film (or an alloy film) is laminated on a dielectric multilayer film, a reflective film in which a dielectric multilayer film is laminated on a metal film (or an alloy film), a reflective film in which a single refractive layer ($TiO_2$, $SiO_2$, or the like) and a metal film (or an alloy film) are laminated together, and the like may be also used.

An anti-reflective film may be formed at a position corresponding to the fixed reflective film 54 in a light-incident surface (a surface where the fixed reflective film 54 is not disposed) of the fixed substrate 51. The anti-reflective film can be formed by laminating a low-refractive index film and a high-refractive index film alternately. The anti-reflective film decreases the reflectivity and increases the transmissivity of visible light on the surface of the fixed substrate 51.

A part of a surface of the fixed substrate 51 facing the movable substrate 52 where the electrode arrangement groove 511, the reflective film installation portion 512, and the connection electrode groove are not formed constitutes a first bonding portion 513. The first bonding film 531 is disposed in the first bonding portion 513. As described above, the fixed substrate 51 and the movable substrate 52 are bonded together by the first bonding film 531 being bonded to the second bonding film 532 that is disposed on the movable substrate 52.

Configuration of Movable Substrate

The movable substrate 52 includes the movable portion 521 that has a circular shape with the central point O of the filter as the center and a holding unit 522 that is coaxial with the movable portion 521 and holds the movable portion 521.

The movable portion 521 is formed to have a greater thickness dimension than the holding unit 522. The movable portion 521 is formed to have a dimension of diameter that is at least greater than the dimension of diameter of the outer circumferential edge of the reflective film installation surface 512A in the planar view of the filter. The movable electrode 562 and the movable reflective film 55 are disposed on the movable portion 521.

As in the case of the fixed substrate 51, an anti-reflective film may be formed on a surface on the opposite side of the movable portion 521 from the fixed substrate 51. Such an anti-reflective film can be formed by laminating a low-refractive index film and a high-refractive index film alternately. The anti-reflective film can decrease the reflectivity and increase the transmissivity of visible light on the surface of the movable substrate 52.

The movable electrode 562 faces the fixed electrode 561 with a predetermined inter-electrode gap interposed therebetween and is formed as a ring that is the same shape as that of the fixed electrode 561. The movable electrode 562 constitutes the electrostatic actuator 56 along with the fixed electrode 561. A movable connection electrode 564 is disposed on the movable substrate 52 and is connected to the outer circumferential edge of the movable electrode 562. The movable connection electrode 564 is disposed across the electrical equipment surface 524 from the movable portion 521 along the position that faces the connection electrode groove (not illustrated) disposed in the fixed substrate 51. The movable connection electrode 564 constitutes the movable electrode pad 564P that is electrically connected to an inside terminal portion in the electrical equipment surface 524.

As described above, the fixed connection electrode 565 is disposed on the movable substrate 52, and the fixed connection electrode 565 is connected to the fixed extraction electrode 563 through the bump electrode 565A.

The movable reflective film 55 is disposed in the central portion of a movable surface 521A of the movable portion 521 facing the fixed reflective film 54 with the gap G1 interposed therebetween. A reflective film that is configured in the same manner as the fixed reflective film 54 described above is used as the movable reflective film 55.

As described above, the example of the inter-electrode gap having a greater dimension than the inter-reflective film gap G1 is described in the present embodiment. However, not limited to this, the dimension of the gap G1 may be configured to be greater than the dimension of the inter-electrode gap depending on the wavelength range of measurement target light in a case where, for example, an infrared ray or a far-infrared ray is used as the measurement target light or in such a case.

The holding unit 522 is a diaphragm that encloses the surrounds of the movable portion 521 and is formed to have a smaller thickness dimension than the movable portion 521. Such a holding unit 522 is more likely to bend than the movable portion 521 and can allow the movable portion 521 to be displaced to the fixed substrate 51 side with slight electrostatic attraction. At this time, the movable portion 521 has a greater thickness dimension and a rigidity than the holding unit 522. Thus, a change in shape of the movable portion 521 is not caused even when the holding unit 522 is pulled to the fixed substrate 51 side by electrostatic attraction. Accordingly, the movable reflective film 55 disposed on the movable portion 521 does not bend, and the fixed reflective film 54 and the movable reflective film 55 can be maintained in a parallel state all the time.

The holding unit 522 is illustrated as a diaphragm in the present embodiment. However, not limited to this, a holding unit, for example, that is shaped as a beam and is arranged at an equiangular interval with the central point O of the filter as the center may be configured to be disposed, or such a configuration may be used.

An area that faces the first bonding portion 513 in the movable substrate 52 is the second bonding portion 523. The second bonding film 532 is disposed in the second bonding portion 523. As described above, the fixed substrate 51 and the movable substrate 52 are bonded together by the second bonding film 532 being bonded to the first bonding film 531.

Configuration of Casing

Returning to FIG. 4, the configuration of the casing 610 in the optical filter device 600 will be described in detail.

The casing 610 includes a base 620 and a lid 630 as illustrated in FIG. 4. The base 620 and the lid 630, for example, can be formed through low-melting glass bonding that uses glass frit (low-melting glass) which is a piece of glass made from melting glass material at a high temperature and cooling melted glass rapidly, adhesion by an epoxy resin and the like, and such a process. Accordingly, an accommodative space is formed inside the base 620 and the lid 630, and the variable wavelength interference filter 5 is accommodated by the accommodative space.

Configuration of Base

The base 620, for example, is configured by laminating ceramic on a thin plate and includes a pedestal portion 621 and a side wall portion 622.

The pedestal portion 621, for example, is configured as a flat plate having a rectangular exterior in the planar view of the filter, and the side wall portion 622 shaped as a tube rises from the peripheral portion of the pedestal portion 621 toward the lid 630. In the present embodiment, the side wall portion 622 is illustrated as being configured as a rectangular tube corresponding to the pedestal portion 621 that is shaped as a rectangular flat plate. However, for example, the side wall portion 622 may be formed as a circular tube or the like.

The pedestal portion 621 includes a light-through hole 623 that penetrates the pedestal portion 621 in the thickness direction of the pedestal portion 621. In a planar view of the pedestal portion 621 in the thickness direction, the light-through hole 623 is disposed to have an area that overlaps with the reflective films 54 and 55 in a state where the variable wavelength interference filter 5 is accommodated by the pedestal portion 621.

A first glass member 627 that is a translucent member and covers the light-through hole 623 is bonded to a surface (base outside surface 621B) on the opposite side of the pedestal portion 621 from the lid 630.

For example, a low-melting glass bonding, a bonding by an adhesive, or the like can be used in bonding the pedestal portion 621 and the first glass member 627 together. In the present embodiment, the accommodative space is maintained in an airtight manner while being maintained in a depressurized state. Accordingly, it is preferable that the pedestal portion 621 and the first glass member 627 be bonded together by using a low-melting glass bonding.

An inside terminal portion 624 is disposed on the inner surface (base inside surface 621A) of the pedestal portion 621 that faces the lid 630 and is connected to each of the electrode pads 564P and 565P of the variable wavelength interference filter 5. The inside terminal portion 624 and each of the electrode pads 564P and 565P, for example, are connected with each other through a wire bonding using a wire made of Au and the like. A wire bonding is illustrated in the present embodiment, but, for example, flexible printed circuits (FPC) and the like may also be used.

A conductive hole 625 is formed at a position where the inside terminal portion 624 is disposed in the pedestal portion 621. The inside terminal portion 624 is connected to an outside terminal portion 626 through the conductive hole 625, the outside terminal portion 626 being disposed on the base outside surface 621B of the pedestal portion 621. The outside terminal portion 626 is electrically connected to the circuit substrate 33.

The side wall portion 622 rises from the edge portion of the pedestal portion 621 and covers the surrounds of the variable wavelength interference filter 5 that is mounted on the base inside surface 621A. A surface of the side wall portion 622 that faces the lid 630, for example, is a flat surface that is parallel to the base inside surface 621A.

The variable wavelength interference filter 5 is fixed to the base 620 by using a fixing material such as an adhesive or the like. At this time, the variable wavelength interference filter 5 may be fixed to the pedestal portion 621 or may be fixed to the side wall portion 622. The position where the fixing material is disposed may be plurally placed. However, to suppress the stress of the fixing material being transmitted to the variable wavelength interference filter 5, it is preferable that the variable wavelength interference filter 5 be fixed at one place.

A part of the base outside surface 621B of the base 620 is bonded to the circuit substrate 33 by a bonding member 333 made of solder or the like. At this time, the base 620 and the circuit substrate 33 are bond together in a manner in which the first glass member 627 bonded to the base outside surface 621B is aligned with a concave portion 331 (will be described further below) that is disposed in the circuit substrate 33 so that the first glass member 627 is inserted inside the concave portion 331. In addition, it is preferable that the outside terminal portion 626 disposed on the base outside surface 621B be bonded to a corresponding terminal portion of the circuit substrate 33 with solder. The outside terminal portion 626 may be bonded to the terminal portion with an anisotropic conductive film such as an anisotropic conductive paste (ACP) and the like.

Configuration of Lid

The lid 630 is a flat glass plate and is bonded to an end surface of the side wall portion 622 of the base 620. As described above, a low-melting glass bonding or the like may be used as a method for bonding the lid 630 and the base 620 together.

Distance Between Variable Wavelength Interference Filter and Translucent Member

The distance between the movable substrate 52 of the variable wavelength interference filter 5 and the first glass member 627 is L1, and the distance between the fixed substrate 51 and the lid 630 is L2 in the optical filter device 600 described above. The maximum wavelength of light emitted from the variable wavelength interference filter 5 (that is, a wavelength of light emitted from the variable wavelength interference filter 5 when the inter-reflective film gap G1 is the initial gap) is $\lambda_{Max}$.

In the present embodiment, the distances L1 and L2 are set to a distance that is 10 times greater than the maximum emitted wavelength $\lambda_{Max}$ and are preferably set to be 100 times greater than the maximum emitted wavelength $\lambda_{Max}$. That is, the wavelength range of light emitted because of light interference that may occur between the movable substrate 52 and the first glass member 627 and the wavelength range of light emitted from the variable wavelength interference filter 5 do not overlap with each other and are different wavelength ranges. In other words, the distances L1 and L2 are respectively set to a distance in which light emitted from the variable wavelength interference filter 5 does not interfere between the movable substrate 52 and the first glass member 627 and a distance in which the light does not interfere between the fixed substrate 51 and the lid 630.

Here, when the distances L1 and L2 are smaller than or equal to 10 times the maximum emitted wavelength $\lambda_{Max}$, light interference that occurs between the movable substrate and the first glass member 627 or between the fixed substrate 51 and the lid 630 may be greatly influential. For example, when light is incident from the lid 630 side of the optical filter device 600 as illustrated in FIG. 4, the light intensity emitted from the variable wavelength interference filter 5 is decreased because of light interference between the movable substrate 52 and the first glass member 627, and the light intensity that the optical sensor 34 receives is also decreased. Alternatively, the light intensity of an objective wavelength that has to be emitted from the variable wavelength interference filter 5 is decreased because of light interference between the fixed substrate 51 and the lid 630.

Regarding this, setting the distances L1 and L2 to be 10 times greater than the maximum emitted wavelength $\lambda_{Max}$ can suppress such undesirableness described above, and setting the distances L1 and L2 to be 100 times greater than the maximum emitted wavelength $\lambda_{Max}$ can suppress the above-described undesirableness more securely. Accordingly, the optical sensor 34 can measure a light intensity with high accuracy.

To miniaturize the photometric unit 30 further, it is preferable that the distances L1 and L2 are as small as possible, and the distances L1 and L2 be optimized under the conditions described above.

Configuration of Circuit Substrate

The circuit substrate 33 is fixed to the front panel 311.

The circuit substrate 33 is formed by laminating thin ceramic plates, and a part thereof that corresponds to the first glass member 627 in the optical filter device 600 has a small number of lamination of thin plates compared with those of other parts. Accordingly, the concave portion 331 (a hole portion) that has a concave shape from the back panel 312 side to the front panel 311 side of the circuit substrate 33 is formed at the part of the circuit substrate 33 that faces the first glass member 627. The surrounds of the concave portion 331 are a flat surface portion 332 that faces the back panel 312 or the optical filter device 600.

The optical sensor 34 is arranged on the bottom surface of the concave portion 331 of the circuit substrate 33.

The optical sensor 34 receives incident light and outputs a detection signal that corresponds to the intensity of received light to the control unit 40.

Here, as described above, the first glass member 627 is positioned inside the concave portion 331 when the optical filter device 600 is bonded to the circuit substrate 33. That is, the first glass member 627 is positioned inside a space S that is enclosed by an imaginary plane extended from a surface of the flat surface portion 332 which faces the back panel 312 and the concave portion 331.

A circuit that connects circuit components such as an IC, a capacitor, and the like or connects these circuit components and the optical sensor 34; a terminal portion that is connected to the outside terminal portion 626 of the optical filter device 600; a filter drive circuit that is connected to the terminal portion and drives the variable wavelength interference filter 5; a sensor drive circuit that drives the optical sensor 34; and the like are disposed on the flat surface portion 332 of the circuit substrate 33.

The circuit substrate 33 is connected to the control unit 40 of the image display apparatus 1 and outputs a detection result (a detection signal based on the intensity of detected light) in the optical sensor 34 to the control unit 40.

The base outside surface 621B of the base 620 of the optical filter device 600 is bonded to the flat surface portion 332 of the circuit substrate 33 by the bonding member 333. The bonding member 333 is configured from lightproof materials such as solder or the like and is disposed to enclose the concave portion 331. This suppresses light from the gap between the optical filter device 600 and the flat surface portion 332 intruding into the concave portion 331 and suppresses a stray light component being received in the optical sensor 34.

Distance Between Optical Sensor and First Glass Member

A distance L3 between the first glass member 627 and the optical sensor 34 is set to a distance that is 10 times greater than the maximum emitted wavelength $\lambda_{Max}$ and is preferably set to be 100 times greater than the maximum emitted wavelength $\lambda_{Max}$ as the distances L1 and L2 described above. That is, the wavelength range of light emitted because of light interference that may occur between the first glass member 627 and the optical sensor 34 and the wavelength range of light emitted from the variable wavelength interference filter 5 do not overlap with each other and are different wavelength ranges. In other words, the distance L3 is set to a distance in which light emitted from the variable wavelength interference filter 5 does not interfere between the first glass member 627 and the optical sensor 34.

The distance L3 is defined as the depth of the groove of the concave portion 331 of the circuit substrate in the present embodiment. Therefore, another member such as a spacer or the like is not used. In addition, the thickness dimension of the bonding member 333 made of solder or the like does not have to be controlled. Thus, the optical filter device 600 can be bonded to the circuit substrate 33 with the smallest amount of the bonding member 333. Accordingly, inclination of the optical filter device 600 regarding the circuit substrate 33, that is, inclination of the variable wavelength interference filter 5 regarding the optical sensor 34 can be suppressed.

Configuration of Control Unit

Figure 7:
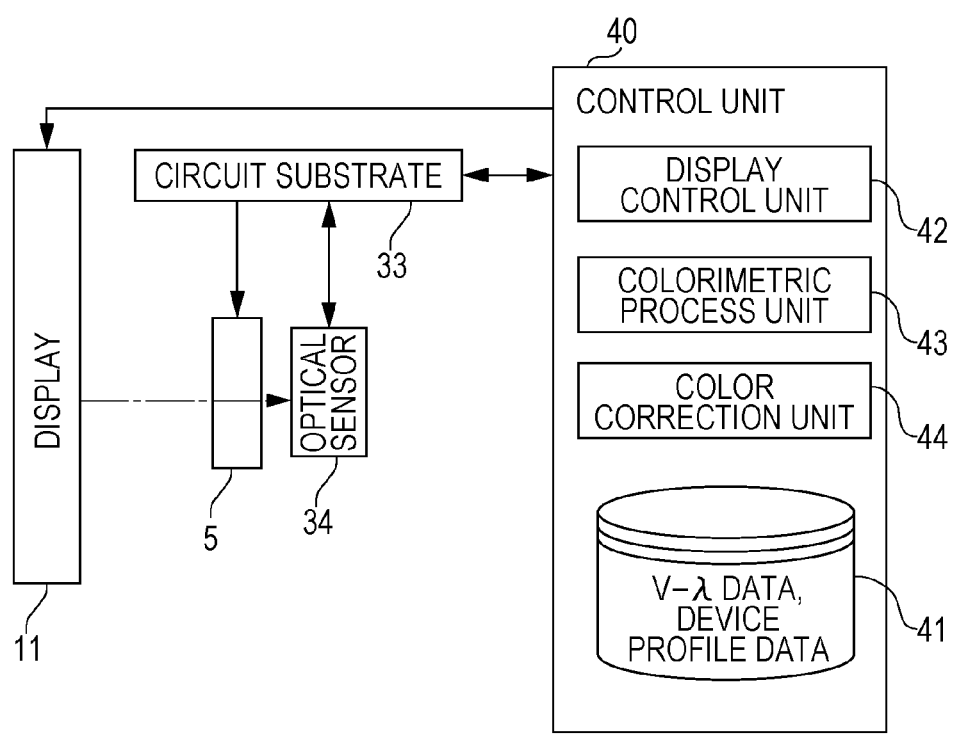
FIG. 7 is a block diagram of the image display apparatus of the first embodiment.

FIG. 7 is a block diagram illustrating the outline configuration of the image display apparatus 1 of the present embodiment.

The control unit 40 includes a storage unit 41, a display control unit 42, a colorimetric process unit 43, and a color correction unit 44 as illustrated in FIG. 7.

The storage unit 41, for example, is configured by a hard disk, a memory, or the like. Various data such as V-λ data that indicates a relationship of the wavelength of light transmitted through the variable wavelength interference filter 5 with a drive voltage which is applied to the electrostatic actuator 56 of the variable wavelength interference filter 5 is stored in the storage unit 41.

In addition, device profile data that is data for reproducing color data of an original image on the display 11 when the image is displayed on the display 11 and stores parameters for controlling the display 11 (for example, a voltage applied to a liquid crystal for setting the transmissivity of each color of RGB to a predetermined value or such things in a liquid crystal panel) regarding each color data is recorded in the storage unit 41.

The display control unit 42 controls the display 11 based on the device profile data stored in the storage unit 41.

The colorimetric process unit 43 drives the electrostatic actuator 56 of the variable wavelength interference filter 5 based on the V-λ data stored in the storage unit 41. In addition, the colorimetric process unit drives the optical sensor 34 to obtain the light intensity that is transmitted through the variable wavelength interference filter 5.

The color correction unit 44 corrects the device profile data based on the spectrum obtained.

Effect of Present Embodiment

The concave portion 331 is disposed in the circuit substrate 33, and the optical sensor 34 is arranged on the bottom surface of the concave portion 331 in the optical module 3 of the present embodiment. In addition, the optical filter device 600 that has the casing 610 which accommodates the variable wavelength interference filter 5 and includes the first glass member 627 which occludes the light-through hole 623 disposed in the base 620 of the casing 610 is bonded to the flat surface portion 332 of the circuit substrate 33. Furthermore, the first glass member 627 is formed smaller than the concave portion 331 and is arranged inside the space S in the concave portion 331 in the planar view of the filter. The distance L3 between the first glass member 627 arranged inside the space S and the optical sensor 34 is set to a distance in which the maximum emitted wavelength $\lambda_{Max}$ of light emitted from the variable wavelength interference filter 5 does not interfere between the first glass member 627 and the optical sensor 34.

In such a configuration, the interference wavelength range when light interference occurs between the first glass member 627 and the optical sensor 34 and the wavelength range of light emitted from the variable wavelength interference filter 5 do not overlap with each other. Therefore, the optical sensor 34 can measure the light intensity of a desired wavelength with favorable accuracy without a decrease in the light intensity emitted from the variable wavelength interference filter 5.

As described above, the distance L3 is set by using the thickness of the circuit substrate 33 (depth of the concave portion 331) in the present embodiment. For this reason, a complex configuration in which other members such as a spacer and the like are disposed is not necessary for setting the distance L3. When the distance L3 is set by the optical filter device 600 controlling the thickness dimension of the bonding member 333, the optical filter device 600 may incline regarding the circuit substrate 33. In this case, the positional relationship between the variable wavelength interference filter 5 and the optical sensor 34 may be displaced, light cannot be incident vertically on the variable wavelength interference filter 5, and resolving power may be decreased. Regarding this, the amount of the bonding member 333 can be suppressed to a minimum in the present embodiment. Thus, the undesirableness described above does not occur, and the measurement accuracy can be maintained.

That is, both the simplification of the configuration and the measuring process with high accuracy by the optical sensor 34 can be compatible in the present embodiment. Accordingly, the device profile data of the display 11 can be appropriately corrected on the basis of the accurate spectrum based on the intensity of detected light, and the display 11 can be controlled with accurate colors that correspond to original image data in the image display apparatus 1.

In the optical module 3 of the present embodiment, the distance L3 between the first glass member 627 and the optical sensor 34 is 10 times greater than the maximum emitted wavelength $\lambda_{Max}$ in the variable wavelength interference filter 5 and is preferably set to be 100 times greater than the maximum emitted wavelength $\lambda_{Max}$.

When the distance L3 is smaller than or equal to 10 times the maximum emitted wavelength $\lambda_{Max}$, light emitted from the variable wavelength interference filter 5 may be decreased because of influence of light interference that occurs between the first glass member 627 and the optical sensor 34. Thus, the measurement accuracy by the optical sensor 34 may be decreased. Regarding this, setting the distance L3 described above can suppress a decrease in light intensity more securely and can suppress a decrease in measurement accuracy in the present embodiment.

In addition, in the optical module 3 of the present embodiment, the distance L1 between the variable wavelength interference filter 5 and the first glass member 627 and the distance L2 between the variable wavelength interference filter 5 and the lid 630 in the optical filter device 600 are also set to be 10 times greater than the maximum emitted wavelength $\lambda_{Max}$ and is preferably set to be 100 times greater than the maximum emitted wavelength $\lambda_{Max}$ as the distance L3 described above.

Accordingly, the influence of unnecessary light interference inside the optical filter device 600 can be excluded, and a decrease in measurement accuracy due to a decrease in light intensity can be further suppressed.

In the optical module 3 of the present embodiment, the optical sensor 34 is disposed inside the concave portion 331 of the circuit substrate 33. Such a configuration purposes simplification of the configuration. In addition, the opening part of the concave portion 331 being lightproof can suppress stray light being incident inside the space S.

In the optical module 3 of the present embodiment, the bonding member 333 that bonds the optical filter device 600 and the circuit substrate 33 together is disposed across an area that encloses the surrounds of the concave portion 331 in the flat surface portion 332. Therefore, light from the gap between the circuit substrate 33 and the optical filter device 600 is not incident into the space S inside the concave portion 331 because of the bonding member 333, and a decrease in measurement accuracy due to stray light can be suppressed.

Second Embodiment

Next, a second embodiment according to the invention will be described on the basis of the drawings.

An example in which the concave portion 331 is disposed in the circuit substrate 33 as the hole portion, and the optical sensor 34 is arranged on the bottom surface of the concave portion 331 is illustrated in the first embodiment described above. Regarding this, the second embodiment is different from the first embodiment described above in that the circuit substrate 33 includes a through hole, and the optical sensor 34 is arranged inside the through hole.

Figure 8:
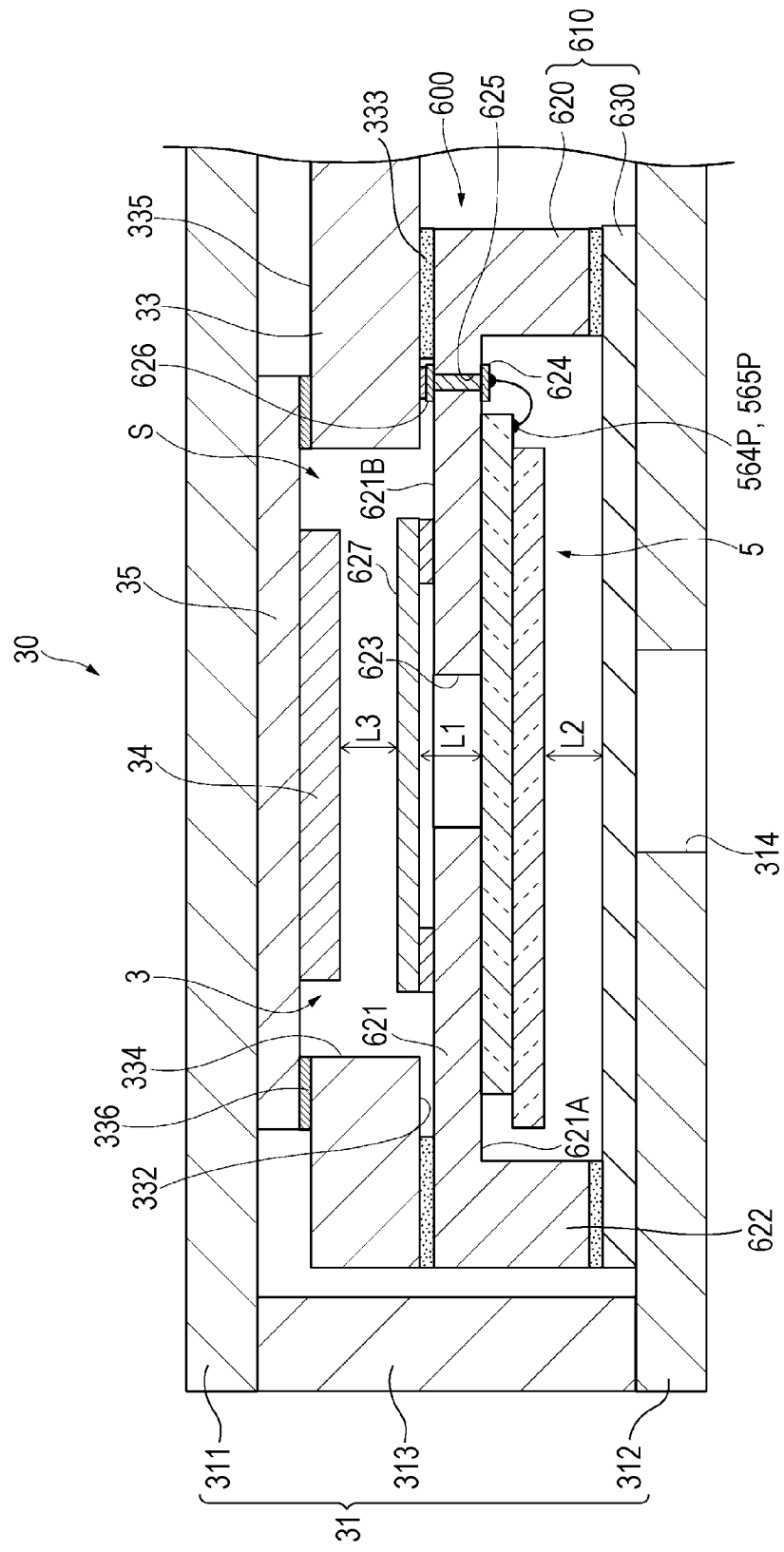
FIG. 8 is a cross-sectional view of a photometric unit of a second embodiment according to the invention.

FIG. 8 is a cross-sectional view illustrating the outline configuration of a photometric unit in the second embodiment of the invention. The same configurations as that in the first embodiment described above is given the same reference signs, and description thereof will be omitted or simplified in accordance with the subsequent description.

As illustrated in FIG. 8, a through hole 334 is disposed as the hole portion in the circuit substrate 33 of the present embodiment along the direction of a normal to the flat surface portion 332 in the circuit substrate 33. That is, the circuit substrate 33 including the through hole 334 is configured by laminating a thin ceramic plate in which a hole portion is disposed at a position that corresponds to the through hole 334. The position where the through hole 334 is disposed is the same as the position of the concave portion 331 in the first embodiment described above.

A second substrate 35 is bonded to a second flat surface portion 335 on the opposite side of the circuit substrate 33 from the flat surface portion 332 covering the through hole 334. At this time, a bonding member 336 that bonds the circuit substrate 33 and the second substrate 35 together is disposed to cover the surrounds of the through hole 334 in the second flat surface portion 335. Accordingly, light from the second flat surface portion 335 side being incident inside the through hole 334 can be suppressed, and a decrease in measurement accuracy by the optical sensor 34 can be suppressed.

The second substrate 35 is connected to the sensor drive circuit disposed on the circuit substrate 33, and the detection signal from the optical sensor 34 is output to the control unit 40 from the second substrate 35 through the sensor drive circuit of the circuit substrate 33. The sensor drive circuit may be configured to be disposed on the second substrate 35.

Effect of Second Embodiment

In the present embodiment, the through hole 334 is disposed in the circuit substrate 33, and the second substrate 35 is disposed on the second flat surface portion 335 of the circuit substrate 33 occluding the through hole 334. The optical sensor 34 is disposed on a surface (a part that abuts the through hole 334) on the side of the second substrate 35 that faces the back panel 312.

In such a configuration, the dimension of the distance L3 can be properly set by using the thickness dimension of the entire circuit substrate 33 even when the thickness dimension of the circuit substrate 33 is small, and the dimension of the distance L3 cannot be sufficiently set in, for example, the concave portion 331 of the first embodiment described above.

In addition, maintenance and the like of the optical sensor 34 are easily performed, and replacement of components and the like are also easily performed since the second substrate 35 is independently configured.

OTHER EMBODIMENTS

The invention is not limited to the embodiments described above. Modifications, improvements, and the like within a range in which the purpose of the invention can be achieved are included in the invention.

For example, an example in which a flat glass plate is used as the lid 630 is illustrated in each embodiment described above. However, not limited to this, the lid 630, for example, may be configured by a metal plate in which a light-through hole is disposed in an area that faces the reflective films 54 and 55 and a glass member that covers the light-through hole. When a metal plate is used as the lid, a seam bonding and the like, for example, can be used as a method for bonding the base and the lid together.

The variable wavelength interference filter 5 described in each embodiment above is an example of the interference filter of the invention. Various improvements and modifications may be added thereto. For example, the variable wavelength interference filter 5 may be configured in a manner in which the dimension of the inter-reflective film gap G1 can be measured by forming an electrode film that is formed of ITO or the like on the reflective films 54 and 55 and detecting electrostatic capacity of these electrode films or may be configured in a manner in which the reflective films 54 and 55 are prevented from being charged by using the electrode films. A single electrode configured by the fixed electrode 561 and the movable electrode 562 is illustrated as the electrostatic actuator 56, but the electrostatic actuator 56, for example, may be structured as a double electrode that uses two concentric fixed electrodes and two movable electrodes that face these fixed electrodes or may have such a structure.

The electrostatic actuator 56 is illustrated as the gap changing unit. However, not limited to this, an inductive actuator, for example, that uses an inductive coil instead of the fixed electrode and the movable electrode and changes the dimension of the inter-reflective film gap G1 using magnetic force or such an actuator may be used as the gap changing unit.

In the embodiments described above, the variable wavelength interference filter 5 is illustrated as being capable of changing the wavelength of emitted light to measure color of light from the display unit 10. However, this does not limit the variable wavelength interference filter 5.

For example, an interference filter with the fixed inter-reflective film gap G1 may be used in a component analyzing apparatus that measures only the light intensity of a predetermined wavelength for analyzing a predetermined component or in an electronic apparatus such as a light source and the like that emits light of a predetermined wavelength.

In this case, the distances L1, L2, and L3 may be set on the basis of light emitted from the interference filter.

In the embodiments described above, the variable wavelength interference filter 5 is illustrated as being bonded to the circuit substrate 33 while accommodated by the optical filter device 600. However, for example, the variable wavelength interference filter 5 may be configured to be directly bonded to the circuit substrate 33 or configured in such a manner. In this case, the distance between the optical sensor 34 and one of the fixed substrate 51 and the movable substrate 52 of the variable wavelength interference filter 5 that faces the optical sensor 34 is set on the basis of the maximum emitted wavelength $\lambda_{Max}$ of light emitted from the variable wavelength interference filter 5.

In the embodiments described above, the distances L1, L2, and L3 are illustrated as being 10 times greater than the maximum emitted wavelength $\lambda_{Max}$. However, not limited to this, the distances L1, L2, and L3, for example, may be smaller than or equal to 10 times the maximum emitted wavelength $\lambda_{Max}$ depending on the purpose of using the optical module provided that a decrease in measurement accuracy is within an allowable range of error.

The bonding members 333 and 336 are illustrates as being arranged to enclose the concave portion 331 or the through hole 334. However, not limited to this, the bonding members 333 and 336 may be configured to be disposed only at a part of the area in cases where light from anywhere except the through window 314 is not incident inside the case 31 such as a case where light from the through window 314 is completely incident on the optical filter device 600 and the like. In this case, lightproof material does not have to be used as the bonding members 333 and 336.

Besides, specific structures when embodying the invention can be appropriately changed to other structures and the like within a range in which the purpose of the invention can be achieved.

The entire disclosure of Japanese Patent Application No. 2014-035041 filed on Feb. 26, 2014 is expressly incorporated by reference herein.

What is claimed is:

1. An optical module comprising:
   a substrate that includes a flat surface and a hole in the flat surface;
   a light-receiving element disposed within a space defined by the hole and a plane of the flat surface; and
   an optical filter device that includes:
      a casing which accommodates an interference filter and includes a light-through hole through which light emitted from the interference filter passes; and
      a translucent member disposed in the light-through hole,
   wherein the translucent member is positioned inside the space,
   the casing is bonded to the flat surface, and
   a distance between the translucent member and the light-receiving element is set to a distance at which light emitted from the interference filter does not interfere between the translucent member and the light-receiving element.

2. The optical module according to claim 1,
   wherein the distance between the translucent member and the light-receiving element is 10 times greater than a wavelength of the light emitted from the interference filter.

3. The optical module according to claim 2,
   wherein the interference filter includes a pair of reflective films that face each other and a gap changing unit that changes a dimension of a gap between the pair of reflective films, and
   the distance between the translucent member and the light-receiving element is 10 times greater than the wavelength of the light emitted from the interference filter when the dimension of the gap is set to a maximum dimension.

4. The optical module according to claim 2,
   wherein the distance between the translucent member and the light-receiving element is 100 times greater than the wavelength of the light emitted from the interference filter.

5. The optical module according to claim 1,
   wherein the hole is a concavity that is recessed into the substrate, and
   the light-receiving element is disposed on a bottom surface of the concavity.

6. The optical module according to claim 1,
   wherein the hole is a through hole that penetrates the substrate in a direction normal to the flat surface,
   the substrate includes a second flat surface on an opposite side of the substrate as the flat surface,
   the optical module includes a second substrate bonded to the second flat surface, the second substrate overlapping with the through hole in a planar view normal to the flat surface, and
   the light-receiving element is disposed on the second substrate.

7. The optical module according to claim 1,
   wherein a distance between the translucent member and the interference filter is set to a distance at which light emitted from the interference filter does not interfere between the translucent member and the light-receiving element.

8. The optical module according to claim 1, further comprising:
   a lightproof bonding member bonding the optical filter device and the substrate together,
   wherein the bonding member is disposed on the flat surface and encloses the hole.

9. An electronic apparatus comprising:
   an optical module that includes:
      a substrate which includes a flat surface and a hole,
      a light-receiving element disposed within a space defined by the hole and a plane of the flat surface, and
      an optical filter device which includes:
         a casing which accommodates an interference filter and includes a light-through hole through which light which is incident on the interference filter or light emitted from the interference filter passes, and
         a translucent member which is disposed in the light-through hole,
      wherein the translucent member is positioned within the space, and
      the casing is bonded to the flat surface; and
   a control unit configured to control the optical module,
   wherein a distance between the translucent member and the light-receiving element is set to a distance at which the light emitted from the interference filter does not interfere between the translucent member and the light-receiving element.

10. An optical module comprising:
    a substrate having a flat surface including a hole;
    a light-receiving element disposed entirely within the hole; and
    an optical filter device including:
       a casing bonded to the flat surface and accommodating an interference filter that includes a light-through hole transmitting light emitted from the interference filter; and
       a translucent member disposed entirely within the light-through hole,
    wherein a distance between the translucent member and the light-receiving element is selected to prevent light emitted from the interference filter from interfering between the translucent member and the light-receiving element.

11. The optical module according to claim 10, wherein the distance between the translucent member and the light-receiving element is 10 times greater than a wavelength of the light emitted from the interference filter.

12. The optical module according to claim 11, wherein the interference filter includes a gap between a pair of reflective films, and the distance between the translucent member and the light-receiving element is 10 times greater than the wavelength of the light emitted from the interference filter when the dimension of the gap is set to a maximum dimension.

13. The optical module according to claim 11, wherein the distance between the translucent member and the light-receiving element is 100 times greater than the wavelength of the light emitted from the interference filter.

14. The optical module according to claim 10, wherein the hole is a concavity recessed into the substrate, and the light-receiving element is disposed on a bottom surface of the concavity.

15. The optical module according to claim 10, wherein the hole is a through hole that penetrates the substrate in a direction normal to the flat surface, the substrate includes a second flat surface on an opposite side of the substrate as the flat surface, the optical module includes a second substrate bonded to the second flat surface, the second substrate overlaps the through hole in a planar view normal to the flat surface, and the light-receiving element is disposed on the second substrate.

16. The optical module according to claim 10, wherein a distance between the translucent member and the interference filter is selected to prevent the light emitted from the interference filter from interfering between the translucent member and the light-receiving element.

17. The optical module according to claim 10, further comprising:

a lightproof bonding member bonded between the optical filter device and the substrate, wherein the bonding member is disposed on the flat surface and encloses the hole.

\* \* \* \* \*